(12) United States Patent
Hessel

(10) Patent No.: US 10,711,881 B2
(45) Date of Patent: Jul. 14, 2020

(54) SELECTOR LEVER RESET DEVICE FOR A VEHICLE GEARBOX, AND METHOD AND DEVICE FOR OPERATING SUCH A SELECTOR LEVER RESET DEVICE

(71) Applicant: ZF Friedrichshafen AG, Friedrichshafen (DE)

(72) Inventor: Alex Hessel, Lemförde (DE)

(73) Assignee: ZF Friedrichshafen AG, Friedrichshafen (DE)

(*) Notice: Subject to any disclaimer, the term of this patent is extended or adjusted under 35 U.S.C. 154(b) by 693 days.

(21) Appl. No.: 15/127,604

(22) PCT Filed: Feb. 19, 2015

(86) PCT No.: PCT/EP2015/053462
§ 371 (c)(1),
(2) Date: Sep. 20, 2016

(87) PCT Pub. No.: WO2015/133908
PCT Pub. Date: Sep. 24, 2015

(65) Prior Publication Data
US 2017/0130819 A1 May 11, 2017

Related U.S. Application Data

(60) Provisional application No. PCT/EP2015/053462, filed on Feb. 19, 2015.

(30) Foreign Application Priority Data

Mar. 20, 2014 (DE) .................. 10 2014 205 248

(51) Int. Cl.
*F16H 59/00* (2006.01)
*F16H 59/02* (2006.01)
*F16H 61/22* (2006.01)

(52) U.S. Cl.
CPC ......... *F16H 59/0204* (2013.01); *F16H 61/22* (2013.01); *F16H 2061/223* (2013.01)

(58) Field of Classification Search
CPC ................ F16H 59/0204; F16H 61/22; F16H 2061/223; B60R 25/066
(Continued)

(56) References Cited

U.S. PATENT DOCUMENTS 6,448,670 B1 * 9/2002 Onodera ................ G05G 9/047
307/10.1
6,676,564 B2 * 1/2004 Gruden ............. B60R 25/02144
335/257
(Continued)

FOREIGN PATENT DOCUMENTS

DE 197 35 290 A1 2/1999
DE 199 44 179 C1 1/2001
(Continued)

OTHER PUBLICATIONS

International Search Report and Written Opinion of the International Search Authority dated May 13, 2015 in International Application No. PCT/EP2015/053462 (English and German languages) (11 pp.).
(Continued)

*Primary Examiner* — Victor L Macarthur
(74) *Attorney, Agent, or Firm* — Brinks Gilson & Lione

(57) ABSTRACT

The present disclosure provides a selector lever resetting device for a vehicle transmission. The selector lever resetting device may include a selector lever configured to select a gear position of the vehicle transmission and a lever guide device, the lever guide device having a first sliding element and a locking slide. The first sliding element may be adjustable along a first sliding axis and has a latching contour. The selector lever may be coupled to the first sliding
(Continued)

element and configured to be moved along the sliding axis between a latching position and an operating position. The locking slide may be adjustable along a second sliding axis to move at least between a latching position and a release position.

16 Claims, 14 Drawing Sheets

(58) Field of Classification Search
USPC .......................................... 74/473.21–473.28
See application file for complete search history.

(56) References Cited

U.S. PATENT DOCUMENTS

| | | | | |
|---|---|---|---|---|
| 7,661,334 B2* | 2/2010 | Giefer | ...................... | F16H 61/24 |
| | | | | 74/523 |
| 7,712,392 B2* | 5/2010 | Molkow | .............. | F16H 59/0204 |
| | | | | 74/473.21 |
| 8,316,734 B2* | 11/2012 | Giefer | ................. | F16H 59/0204 |
| | | | | 74/473.12 |
| 2008/0028886 A1* | 2/2008 | Molkow | .............. | F16H 59/0204 |
| | | | | 74/523 |
| 2008/0295633 A1* | 12/2008 | Giefer | ..................... | F16H 61/22 |
| | | | | 74/473.21 |

FOREIGN PATENT DOCUMENTS

| | | |
|---|---|---|
| DE | 10 2005 023 926 A1 | 11/2006 |
| DE | 10 2007 015 262 A1 | 10/2008 |
| DE | 10 2007 015 375 A1 | 10/2008 |
| DE | 10 2007 058 850 A1 | 6/2009 |
| DE | 10 2007 058 922 B3 | 6/2009 |
| DE | 10 2008 041 374 A1 | 2/2010 |
| DE | 10 2012 107 869 A1 | 2/2014 |
| DE | 10 2013 007 233 A1 | 10/2014 |
| JP | 2004-114832 A | 4/2004 |
| JP | 2008-302816 A | 12/2008 |
| WO | WO 2009/071080 A2 | 6/2009 |

OTHER PUBLICATIONS

German Search Report dated Dec. 11, 2014 for German Patent Application No. 10 2014 205 248.3 (German language with two-page English explanations) (9 pp.).

* cited by examiner

SELECTOR LEVER RESET DEVICE FOR A VEHICLE GEARBOX, AND METHOD AND DEVICE FOR OPERATING SUCH A SELECTOR LEVER RESET DEVICE

CROSS REFERENCE TO RELATED APPLICATIONS

This application is a filing under 35 U.S.C. § 371 of International Patent Application PCT/EP2015/053462, filed Feb. 19, 2015, and claims the priority of German Patent Application 10 2014 205 248.3, filed Mar. 20, 2014. These applications are incorporated by reference herein in their entireties.

TECHNICAL FIELD

The present disclosure is related to a selector lever resetting device for a vehicle transmission, a process for the operation of such selector lever resetting device, and a corresponding device as well as to a corresponding computer program product.

BACKGROUND

The increasing electronification of vehicle systems has also initiated a change in technology in the area of transmission control. The replacement of the mechanical transmission actuation is referred to as shift-by-wire. In this, the mechanical connection between the gear shifter and transmission can be replaced by an electric or electronic interface. The implementation of the shifting operation in the gearbox is done, for example, hydraulically or electrically.

To do this, a control element can be equipped with a sensor system for detecting the driver wishes, which can be passed on to the gear box via a corresponding interface.

BRIEF SUMMARY

Against this background, the present disclosure provides a selector lever resetting device for a vehicle transmission, a method and a device for the operation of such selector lever resetting device as well as finally a corresponding computer program product in accordance with the principal claims. Favorable arrangements are resulting from the subsidiary claims and the following description.

The present disclosure provides a selector lever resetting device for a vehicle transmission, in which the selector lever resetting device has the following characteristics:

a selector lever to select a gear position of the vehicle transmission; and a lever guide equipment that has at least one sliding element and a locking slide, where the sliding element is arranged as movable in the lever guide equipment along a sliding axis and has a latching contour, in which the selector lever is mechanically coupled or is couple able with the sliding element, in order to be moved along the sliding axis between a latching position and an operating position, in which the locking slide is arranged as movable in the lever guide equipment along a slide axle different from the sliding axis at least between a latching position and a release position and has at least a latching element, in which the latching element is engaged with the latching contour, when the selector lever is in the operating position and the locking slide is in the rest position, and the latching element releases the latching contour, when the locking slide is in the release position.

Under a selector lever a lever arranged in a vehicle to operate the vehicle gearbox can be understood. The vehicle transmission can be executed as an electronically selectable gear box, also called as shift-by-wire transmission. Here, a control signal can be deployed to select a gear position of the vehicle transmission by actuating the selector lever. Under a gear position a transmission level or a mode of operation of the vehicle gearbox can be understood. Under a lever guide equipment the equipment can be understood, which is designed to enable a controlled movement of the selector lever between the defined lever positions. Under a sliding element a sliding plate or a sliding frame can be understood. Under a latching contour an elevation formed on the sliding element, a recess in the slide element or a hook-shaped element can be understood. Under a locking slide a sliding carrier element with a latching element can be understood. Under a latching element a component can be understood, which is formed to intervene in the latching contour that a movement of the selector lever is blocked along the sliding axis. For example, in case of the latching element it can be about a nose-shaped or hook-shaped element, which is formed to glide through an elevation of the latching contour and to wedge it with the latching contour or to get hooked in a recess of the latching contour.

The present approach is based on the recognition that a selector lever for a vehicle gearbox can be fixed by means of a latching mechanism in a predefined lever position and can be moved back when releasing the latching mechanism into a starting position. The latching mechanism can be released advantageously with very minimal effort, by, for example, moving the two interlocking latching elements against each other. Thus, it is possible to reduce an actuator force required to reset the selector lever in the original position when compared to conventional solutions. The actuator force can be reduced to a minimum, if a preload force acts on the selector lever in accordance with one embodiment described below, so that the selector lever is moved back by the preload force in the original position when releasing the latching mechanism. This can reduce the production cost of a selector lever resetting device. In addition, an acoustic of the selector lever resetting device can be improved as a result.

In a mechanical operating of the gearshift stick, for example, of a cable-controlled gearshift, the selector lever position always matches with the gear position because of the mechanical coupling such that the gear positions are stable; the selector lever positions are also stable.

An electric gear shift, also called as shift-by-wire or E-gear shift, may have no mechanical coupling between selector lever and gear. This can cause problems in operating the gearshift stick with the stable positions of selector lever. For example, under certain conditions and in the event of a fault it may lead to, that the selector lever position no longer aligns with the gear position, so that the driver may receive incorrect information in some circumstances. To prevent this, the selector lever of the gear position can be repositioned.

Using a selector lever resetting device pursuant to the approach presented here the selector lever of an actual gear position can be repositioned efficiently, so that it is ensured that the position of the selector lever aligns with the actual gear position. For example, the selector lever resetting device can be formed to move the selector lever to its activity in a non-critical position without having required the strong engines or large transmissions. Thus, an electronic shifting of the gears can be realized, which has similar stable selector lever positions such as a mechanical gear shifter despite missing mechanical coupling between gear box and selector lever.

In accordance with the present disclosure, an embodiment of the selector lever resetting device can be provided with at least a spring element that is formed to push the latching element against the latching contour. By this, a reliable locking of the latching contour is ensured with the latching element.

In accordance with an another embodiment the selector lever resetting device can be provided with a drive unit, which is formed to move the lock slide at least between the latching position and the position of the release. Under a drive unit, for example, an electric, pneumatic, or hydraulic motor or an electromagnet can be understood. The locking slide can be moved quickly and in controlled manner by means of the drive unit. By the fact that only frictional resistance will be overcome when moving the lock slide, the drive unit can be run very compact and cost-effectively.

The drive unit can advantageously be coupled with a step-up gear unit. In particular, the step-up gear unit can be formed to transmit a rotary motion generated by the drive unit into a linear movement of the locking slide. By means of the step-up gear unit, an efficient power transfer can be realized from the drive unit to the locking slide. Thus, the step-up gear unit enables the use of less expensive engines in particular by rotating motors as a drive unit.

The selector lever resetting device can have a gear shifting gate, which has at least a first recess associated with the latching position and a second recess associated with the operating position, where the first recess and the second recess are connected to each other through an inclined exchange area. Here, an end range of selector lever can be arranged in the gear shifting gate as movable at least between the first recess and the second recess. Under a gear shifting gate a shell-like device to guide the end range of the selector lever can be understood. For example, the gear shifting gate can have a base plate, in which the two recesses are formed. The recesses can be implemented as shift gates. Under an inclined surface of the exchange a bevel between the recesses can be understood. For example, the exchange area can be designed as a diagonal groove between the first and the second recess. By means of the gear shifting gate the selector lever can be moved comfortably, i.e. with low resistance along a predetermined path of lever. With this, it is also ensured that a lever position aligns with the gear position.

In accordance with a further embodiment, the selector lever resetting device can be realized with a preload device, which is formed to preload the selector lever with a preload force, wherein the selector lever is formed to be moved in the release position by the preload force from the operating position back to the latching position. Under a preload device a device can be understood, which is formed, to impinge the selector lever by means of a suitable preload means, such as a spring element, with a preload force. Such preload device has the advantage that the selector lever can be reset only through the action of the preload force, i.e. without the use of an additional actuator, in the latching position.

In order to realize an efficient selector lever resetting device with a possible compact design, the selector lever may include a lever recess. The preload device may comprise a locking body slidably arranged or arrangeable in the lever recess and at least one preload element for the preload of the locking body. An end portion of the locking body can be arranged slidably within the gear shifting gate at least between the first recess and the second recess. In particular, in this case the locking body can be preloaded in the operating position with a larger preload force than in the latching position. Under a locking body, an elongated, cylindrical body can be understood. Under a preload element a spring can be understood. For example, the spring can be tensioned in the lever recess between the locking body and the selector lever to preload the locking body. The end portion of the locking body can have one rounding corresponding to a shape of the first and the second recess. By the fact that the locking body may be preloaded in the actuating position with a larger preload force than in the latching position, it is ensured that the selector lever returns to the latching position reliably and with very little effort.

The first recess as automatic lane for the automatic shifting of the vehicle transmission and the second recess as a manual lane for the manual shifting of the vehicle transmission can be designed in accordance with an another embodiment. In particular the latching position can correspond to a parking position of the vehicle transmission. Under a parking position, also called as auto-P position, a position of the vehicle transmission can be understood, in which the vehicle transmission is blocked. Through this embodiment it is guaranteed that the selector lever automatically returns from the manual lane in the parking position in case of activating the parking position.

The locking slide, also called a locking element, can also have at least one blocking element and can be formed to be moved along the slide axle in a blocking position. Here, the blocking element in the blocking position can prevent any movement of the selector lever from the latching position to the operating position. Under a blocking element an element of the locking slide can be understood, which blocks a way of the selector lever in the blocking position. For example, the locking slide can be executed with a lug or a pin as a block element. By means of the blocking element, it can be prevented that the selector lever is reset accidentally in the rest position by a driver of the vehicle.

The selector lever with the sliding element can be coupled with very low production efforts and costs, if the selector lever is carried out by a recess of the sliding element.

The lever guide device can also have another slide element, where the further slide element is arranged along other sliding axis different from the sliding axis in movable manner in the lever guide device and is designed to allow a movement of the selector lever between a majority of predefined lever positions along the other sliding axis. In particular, in this case the sliding element and/or the locking slide can be arranged as moveable to the other sliding element. The other sliding axis and the slide axle can run especially parallel to each other. This form of execution allows a controlled operation of the selector lever in several directions. At the same time you can run the lever guide device with a most possible compact design. Thus, the selector lever can be used for the control of several different functions.

The approach presented here also creates a process to operate a selector lever resetting device in accordance with one of the previously described embodiments, whereby the procedure includes the following steps:

engagement of the latching contour with the latching element due to a movement of the selector lever from the latching position to the actuating position along a sliding axis; and release of the latching contour due to a movement of the locking slide from the latching position to the release position along a slide axle different from the sliding axis.

Finally, the present approach creates a device that is formed to perform or to control all steps of a procedure in accordance with one of the embodiments described herein.

An electrical device can be understood under a device in this case, which processes the sensor signals and gives output as a function of control and/or data signals. The control unit can have an interface, which can be formed by hardware and/or software. In case of a hardware formation, the interfaces can be, for example, a part of a so called system ASIC, which includes a wide range of functions of the control unit. However, it is also possible that the interfaces are of their own, integrated circuits or at least partially composed of discrete components. In case of a software formation the interfaces can be the software modules, which are available, for example, on a microcontroller in addition to other software modules.

It may also be advantageous to provide a computer program product with program code that can be stored on a machine-readable disk such as a semiconductor memory, on a hard drive memory or on an optical memory, and is used to perform the procedure in accordance with one of the above-described embodiments, when the program is run on a computer or device.

BRIEF DESCRIPTION OF THE DRAWINGS

The present embodiments are explained as an example on the basis of the attached drawings. They show.

DETAILED DESCRIPTION

In the following description of preferred embodiments of the present disclosure, the same or similar reference signs are used for the elements shown in the various figures and similar-looking elements, in which a repeated description of these elements is removed.

Figure 1:
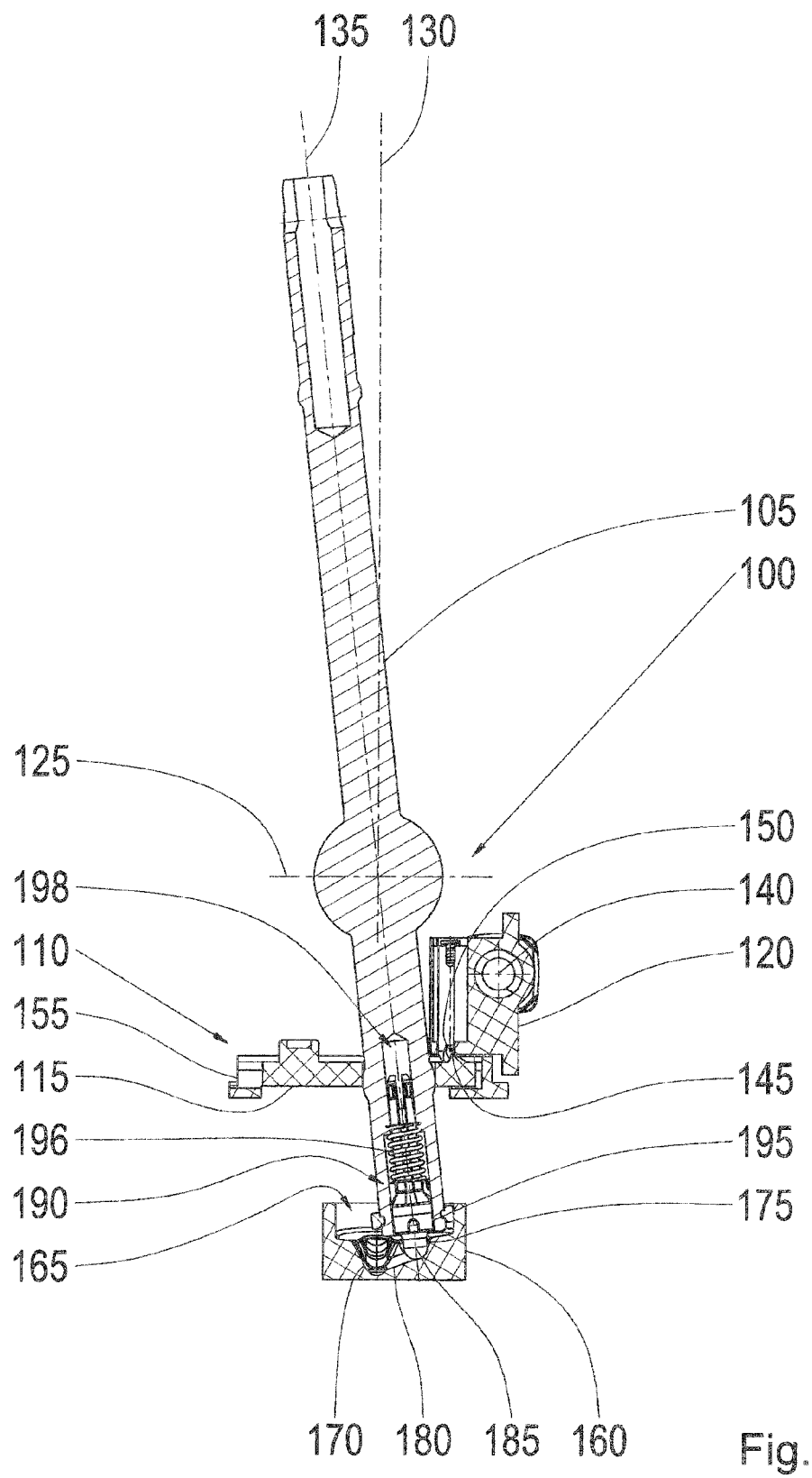
FIG. 1 is a schematic cross section presentation of a selector lever resetting device in accordance with one embodiment of the present disclosure.

FIG. 1 shows a schematic cross section presentation of a selector lever resetting device 100 in accordance with one embodiment of the present disclosure. The selector lever resetting device 100 includes a selector lever 105 to select a gear position of vehicle gearing (not shown here) and a lever guide device 110. The lever guide device 110 includes a sliding element 115 and a locking slide 120. The sliding element 115 is arranged movable along a sliding axis 125 in lever effect device 110. The sliding element 115 is plate-like shaped and has a recess, through which the selector lever 105 is carried out to mechanically couple the selector lever 105 with the sliding element 115. The selector lever 105 is formed to be moved using the sliding element 115 between a latching position 130 and an operating position 135 along the sliding axis 125. As an example, the selector lever 105 is arranged in the latching position 130 at right angles to the sliding element 115 and arranged in the operating position 135 at an acute angle to the sliding element 115. In FIG. 1 the selector lever 105 is shown in the operating position 135.

The locking slide 120 is arranged according to this embodiment in a marginal area of the lever guide device 110 along the slide axle 140 deviating from the sliding axis 125 movable between a latching position and a release position on the sliding element 115. In FIG. 1 the slide axle 140 and the sliding axis 125 are exemplarily running perpendicular to each other, where the slide axle 140 runs perpendicular to a consideration level and thus is presented as a point. The sliding element 115 is formed to move the selector lever 105 in the operating position 135 so in the direction of the locking slide 120, that a marginal area of the sliding element 115 is covered by the locking slide 120.

The slide element 115 includes a locking contour 145, also called as rastering or rastering contour, which is formed as an elevation in the marginal area of the sliding element 115 according to this embodiment. The locking slide 120 comprises a latching element 150, which is latched in the latching position of the locking slide 120 that is shown in FIG. 1 with the latching contour 145. The latching element 150 can also be referred to as a rastering element.

According to this embodiment the latching element 150 is performed as a latch nose, which is formed to be pressed while moving the sliding element 115 in the direction of the lock slide 120, i.e. When you move the selector lever 105 in the operating position 135, through the elevation of the latching contour 145, so that the selector lever 105 is fixed in the operating position 135.

In FIG. 1 the selector lever resetting device 100 is shown with an optional additional sliding element 155, where the other sliding element 155 is arranged along another sliding axis moveable in lever guide device 110. According to this embodiment, another sliding axis matches with the slide axle 140, so that the sliding element 115 and the other sliding element 155 are perpendicularly moveable to each other.

Also the sliding element 115, as shown in FIG. 1, can be arranged movable in the other sliding element 155. The other sliding element 155 thus fulfills the functions of a framework to guide the sliding element 115 along the sliding axis 125. The other sliding element 155 can also be referred as longitudinal slide and the sliding element 115 also as cross section slide accordingly. The other slide element 155 can be arranged in turn moveable in a direction of a track or latching device not shown here, which can be some part of a casing of selector lever resetting device 100. Thus, the selector lever 105 is formed, to 155 to be moved along two sliding axis 125, 140 by means of the sliding elements 115. For example, the selector lever 105 is movable along the other sliding axis 140 between majorities of the predefined lever position.

The locking slide 120 can be arranged adjacent to an edge of the other slide element 155 running parallel to the other sliding axis 140 or to the slide axle 140. The edge can serve as a guide track to guide the locking slide 120 between the latching position and the position of the release.

The selector lever resetting device 100 additionally includes a gear shifter 160. The gear shifter 160 is designed as a shallow element with a scene recess 165. A floor space of the scene recess 165 has a first recess 170 and a second recess 175. First recess 170 is designed, for example, as automatic lane for the automatic shifting of the vehicle transmission and the second recess 175 as a manual lane for the manual shifting of the vehicle transmission. The recesses 170, 175 are thus forming a rastering for the selector lever 105. The manual lane can also be called tip lane. The recesses 170, 175 are interconnected via an exchange lane 180, in which the exchange lane 180 acts as an exchange area to change a position of lever between the first recess 170 and the second recess 175.

As an example, the first recess 170 is run with a depth greater than the second recess 175. The exchange lane 180 thus has a tendency.

The lever end 185 of the selector lever 105 is arranged movable between the first recess 170 and the second recess 175 in the gear shifter 160. The lever end 185 is arranged and formed in the second recess 175 in the operating position 135 to be moved in the first recess 170 when you move the selector lever 105 in the latching position 130 via the exchange lane 180. For example, the latching position 130 matches with a parking position of the vehicle transmission.

According to this embodiment, the selector lever resetting device 100 is realized with an optional preload device 190. The preload device 190 includes an elongate locking body 195 and a preload element 196 for the preload of the latching body 195. The preload element 196 is implemented by way of example as a helical spring. The selector lever 105 is formed in the area of the lever end 185 with a lever recess 198, in which the latching body 195 is arranged moveable in the lever recess 198. By way of example, the latching body 195 in FIG. 1 is moveable along a longitudinal axle of the selector lever 105.

According to this embodiment the latching body 195, which can be described as rastering element, is carried through by the preload element 196, where the preload element 196 is clamped in the selector lever 105, that an end portion of the latching body 195 is pressed by a preload force of the preload element 196 in the gear shifter 160. The end portion of the latching body 195 is jutting out into this pretensioned state of the selector lever 105 from the lever recess 198. The end portion of the latching body 195 thus forms the lever end 185 as moveable between the recess 170 and 175. The latching body 195 is formed to press the selector lever 105 in the release position of the locking slide 120 not shown here by the preload force of the actuating position 135 on a slope of the exchange lane 180 and back to its latching position 130. By the fact that the second recess 175 has a lower depth than the first recess of 170, the prestressing of the header element 196 in the operating position 135, in which the lever end 185 is arranged in the second recess 175, is greater than in the latching position 130, in which the lever end 185 is arranged in the first recess 170.

The FIGS. 2a to 2d show schematic three dimensional presentations of a selector lever resetting device 100 with blocked manual lane 175 in accordance with one embodiment of the present disclosure. In contrast to FIG. 1 the lever end of selector lever 105 is arranged in the first recess, which is realized as automatic lane. The selector lever 105 is formed in and out to be moved between various lever settings in the automatic lane. As already described on the basis of FIG. 1, the second recess 175 is implemented as a manual lane accordingly.

In addition the locking slide 120 has a block element 200. The block element 200 is implemented by way of example through a flat projection of a bottom plate of the locking slide 120, which extends the projection on a base of the locking slide 120. The blocking member 200 extends adjacent to a surface of the sliding element 115 and parallel to a main extension level of sliding element 115. Alternatively, the blocking member 200 may be formed as a pin or as another element with an appropriate geometrical shape.

The locking slide 120 is arranged in the FIGS. 2a to 2d in a blocking position in contrast to FIG. 1, in which the selector lever 105 is blocked by the block element (or locking element) 200, that the selector lever 105 is locked up in the automatic gate, i.e. can be moved only along the automatic gate.

The selector lever resetting device 100 shown in FIGS. 2a to 2d is also equipped with a drive unit 205, which is exemplified as an electric motor and is coupled mechanically with the locking slide 120 to the locking slide 120 along the slide axle 140 between the locking position to move the release position and here shown blocking position. In order to realize a most compact design of the selector lever resetting device 100, the drive unit 205 can be arranged on the blocking slide 120.

Figure 2A:
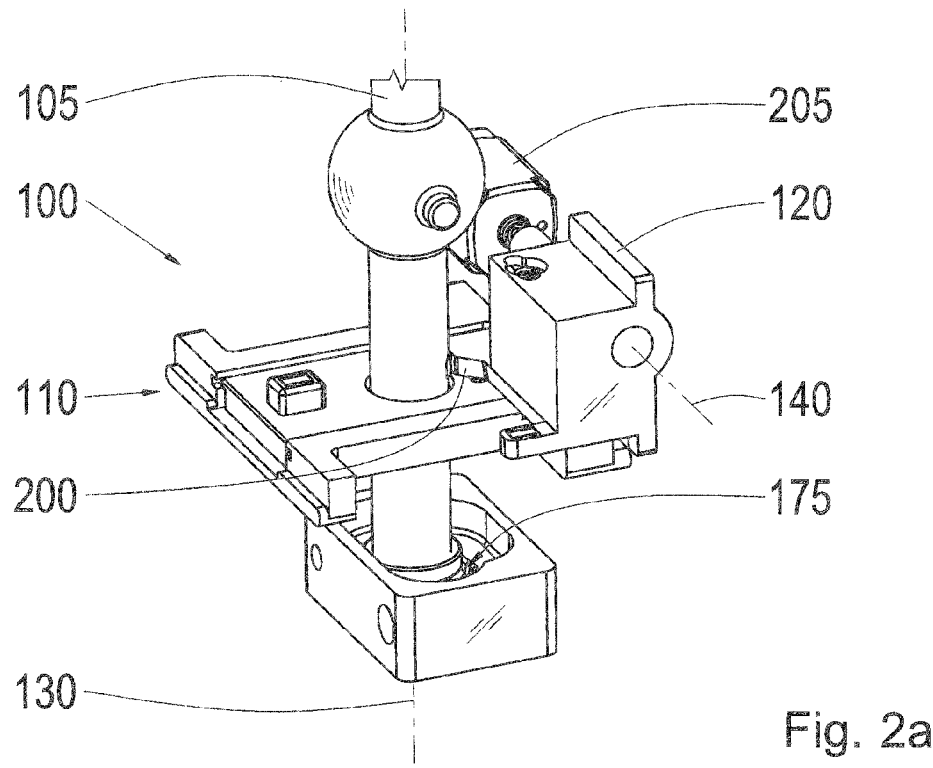
FIGS. 2a, 2a, 2c, 2d are schematic three dimensional presentations of selector lever resetting device with blocked manual lane in accordance with one embodiment of the present disclosure.

FIG. 2a shows the selector lever 105 in the rest position 130, also referred to as X-position. The rest position 130 is for example centrally disposed between a first end and a second end of the automatic gate.

Figure 2B:
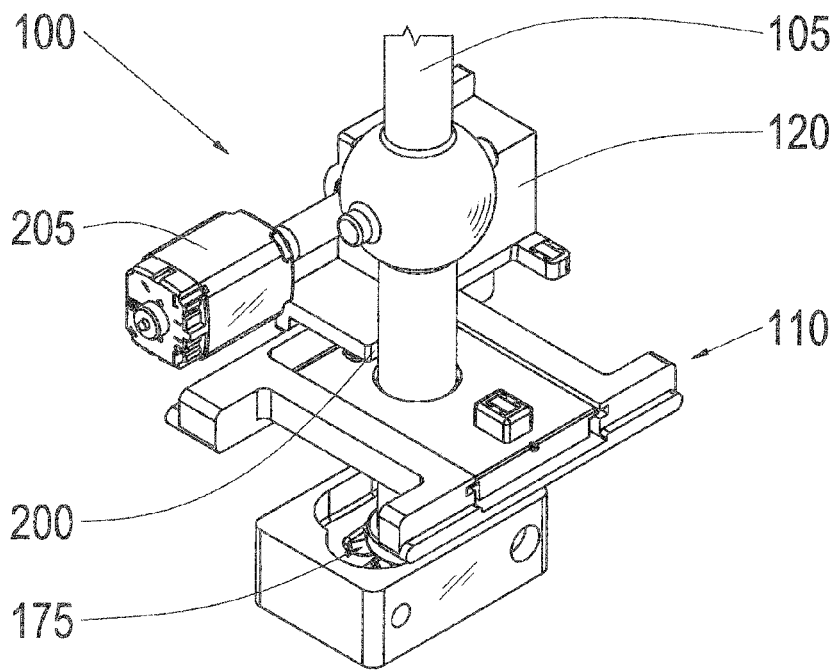

FIG. 2b shows a rear view of the selector lever resetting device 100 shown in FIG. 2a.

Figure 2C:
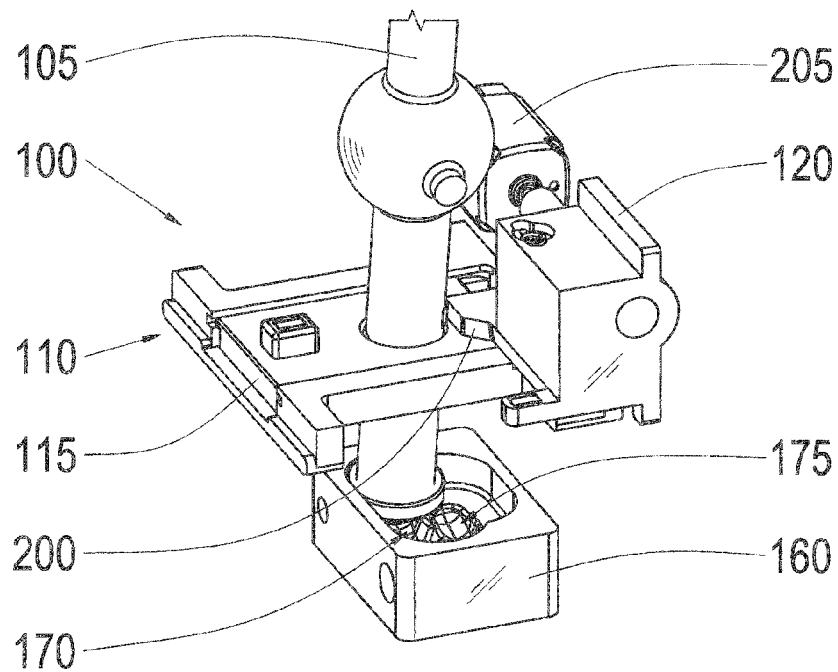

FIG. 2c shows the selector lever 105 in a first automatic position, also called the A-position. The end of the lever is arranged in the first end of the automatic gate 170, in the A-position.

Figure 2D:
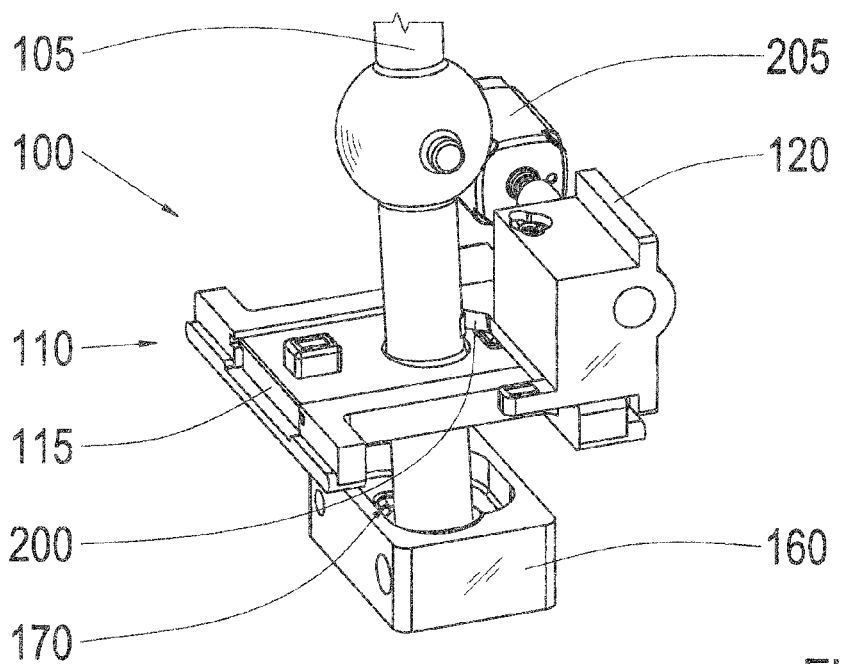

FIG. 2D shows the selector lever 105 in a second automatic position, also called a B-position. The end of the lever is arranged in the second end of the automatic gate 170 in the B-position.

In contrast to the rest position 130, the selector lever 105 is arranged in the A- and the B-position each diagonally to the sliding element 115 or the gear shifter 160.

FIGS. 3a to 3e show schematic three-dimensional representations of a selector lever resetting device 100 with released manual gate 175 in accordance with one embodiment of the present disclosure. In contrast to the FIGS. 2a to 2d, the locking slide 120 is shown in FIGS. 3a to 3e in the locking position. The blocking element is moved into a position in the locking position in which the lever path between the latching position and the operating position is released.

Figure 3A:
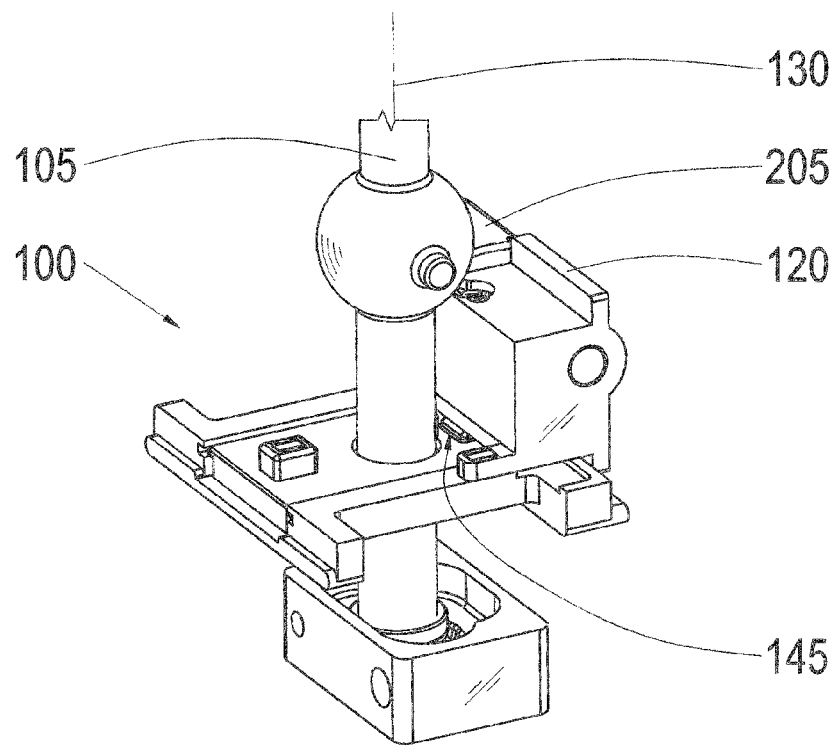
FIGS. 3a, 3b, 3c, 3d, 3e are schematic three dimensional presentations of the selector lever resetting device with released manual lane in accordance with one embodiment of the present disclosure.

The selector lever 105 is shown as in FIG. 2A in the latching position 130 in FIG. 3a. Here, the latching contour 145 is positioned adjacent to the selector lever 105 a facing edge of the locking slide 120.

Figure 3B:
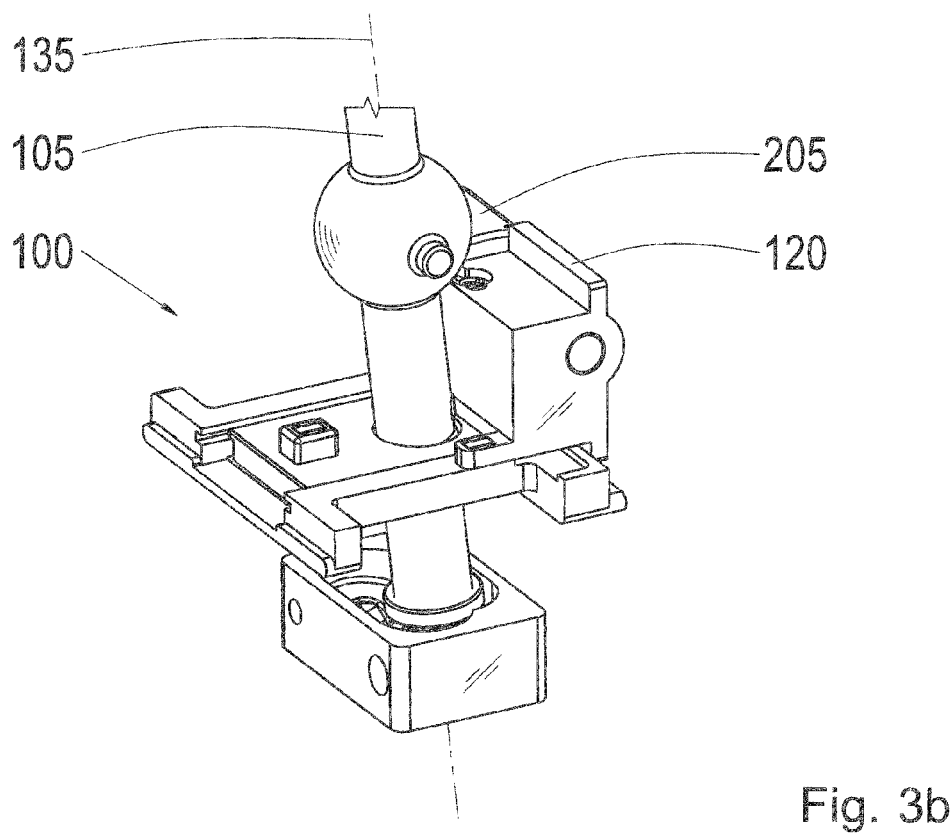

FIG. 3b shows the selector lever 105 in the operating position 135, also called as M position. The latching contour is covered by the locking slide 120 and locked with also not visible locking element. The selector lever 105 is arranged movable along the manual gate.

Figure 3C:
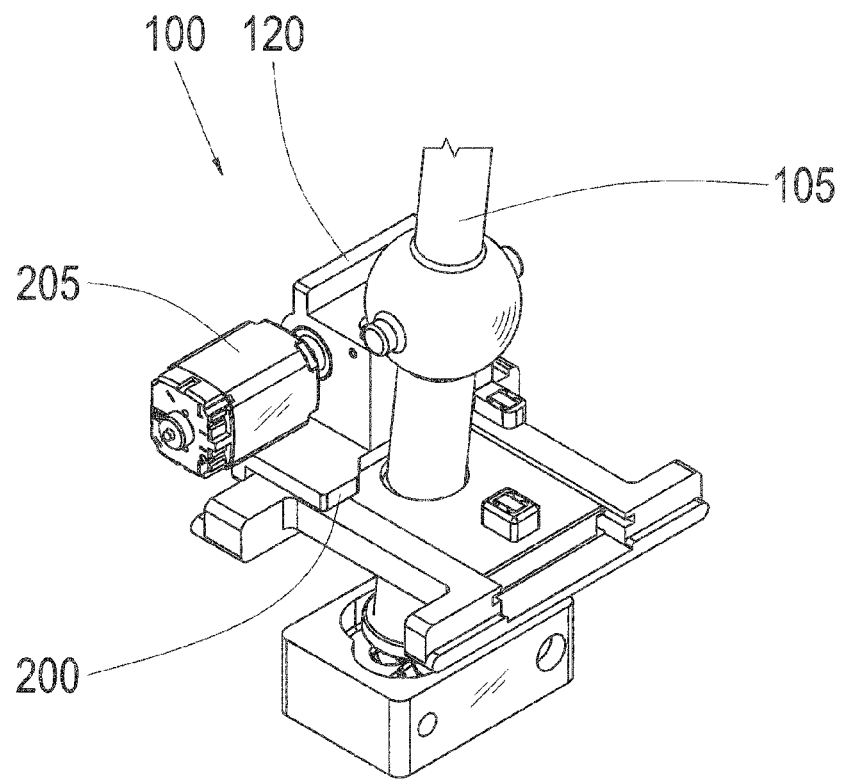

FIG. 3c shows a consideration in FIG. 3b shown selector lever resetting device 100 with the deactivated block element 200.

Figure 3D:
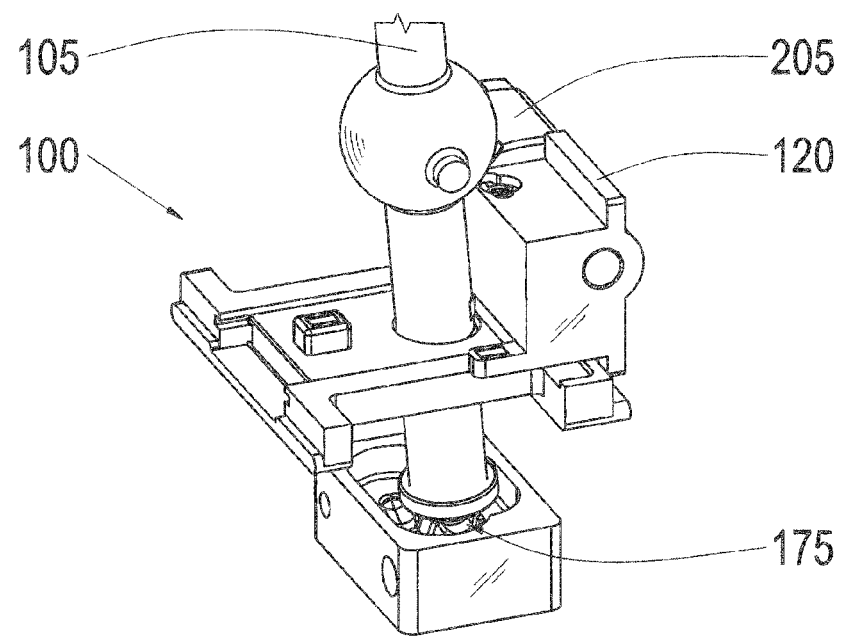

FIG. 3d displays the selector lever 105 in a first manual shift position, also called as Plus position, in which the selector lever 105 is arranged in a first end of the manual gate 175. For example, the vehicle transmission is designed to be switched when moving the selector lever 105 in the plus position in a higher gear.

Figure 3E:
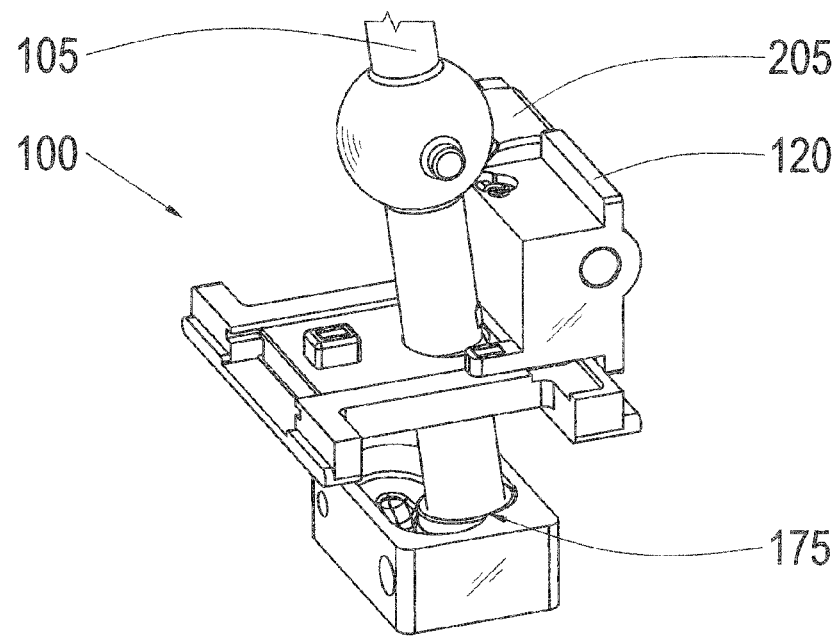

FIG. 3e shows the selector lever 105 of a second manual shift position, also called as minus position in which the selector lever 105 is arranged in a second end of the manual gate 175. For example, the vehicle transmission is designed to be switched while moving the select lever of 105 in the minus position in a lower gear.

Figure 4:
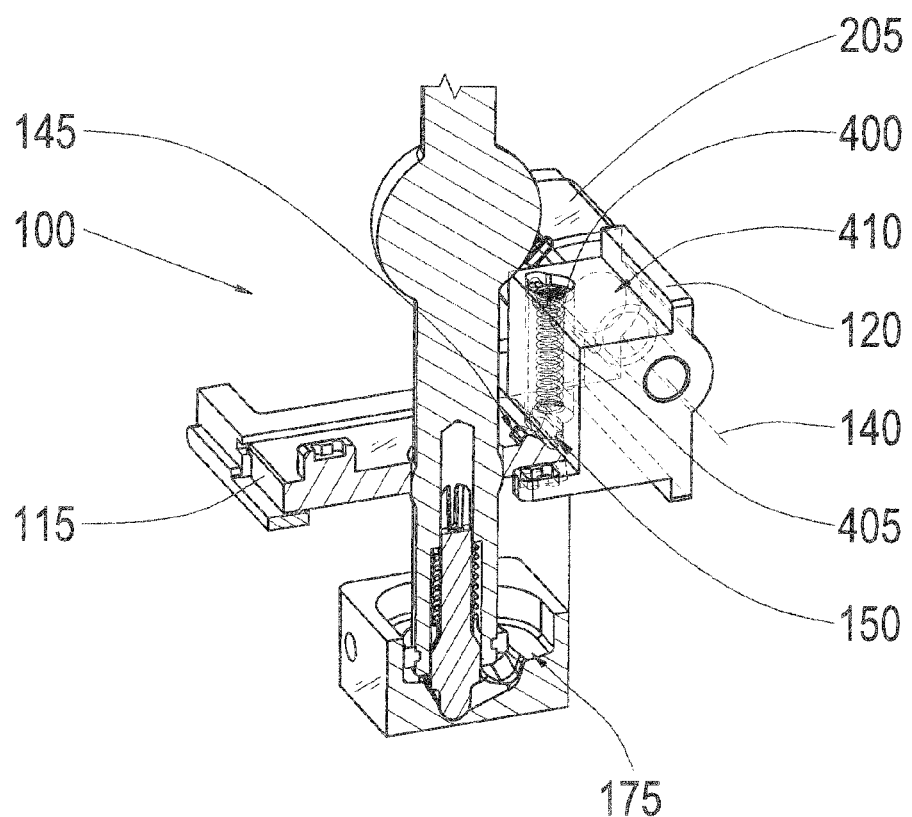
FIG. 4 is a schematic three-dimensional cross-section presentation of a selector lever resetting device with released manual lane in accordance with one embodiment of the present disclosure.

FIG. 4 shows a schematic three-dimensional cross-sectional representation of a selector lever resetting device 100 with shared manual gate 175 according to an embodiment of the present disclosure. In particular, a cutout view of the selector lever resetting device 100 shown in FIG. 3a is represented In FIG. 4. The lock slide 120 is shown with a guide channel 400 for guiding the locking element 150. As an example, the guide channel 400 runs perpendicular to the sliding element 115. There is a spring element 405 in the Guide Channel 400. The spring element 405 is connected between an end opposite the locking element 150 channel end of the guide channel 400 and the locking element 150 is clamped such that the locking member 150 is pressed against the edge region of the sliding element 115, in which the latching contour 145 is designed as an elevation. Thus, a slip resistant locking of the locking element 150 is made possible with the latching contour 145 in here not shown latching position of the locking slide.

The selector lever resetting device 100 is realized also in FIG. 4 with a transmission gear 410, which extends as an example along the slide axle 140 in the locking slide 120. Here, a shaft of the drive unit 205 is rotationally fixed to the transmission gear 410, respectively. The transmission gear 410 is formed, for example as a spindle and serves to transmit a rotation of the shaft of the drive unit 205 in a linear movement of the locking slide 120 along the sliding axis 140.

Figure 5A:
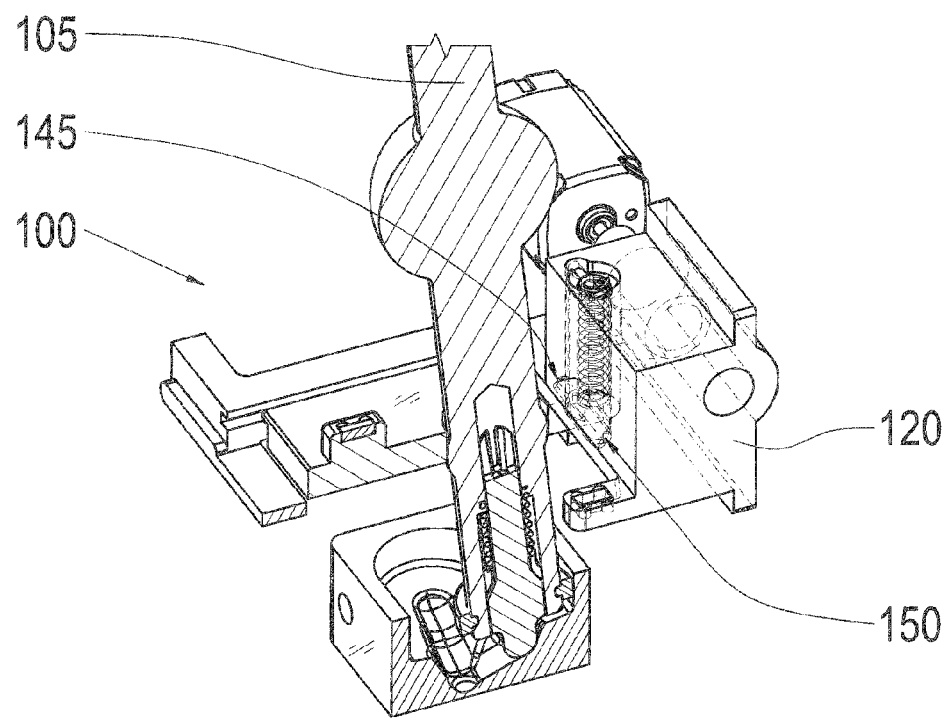
FIGS. 5a, 5b are schematic three-dimensional cross-section presentations of a selector lever resetting device with locked selector lever in accordance with one embodiment of the present disclosure.
Figure 5B:
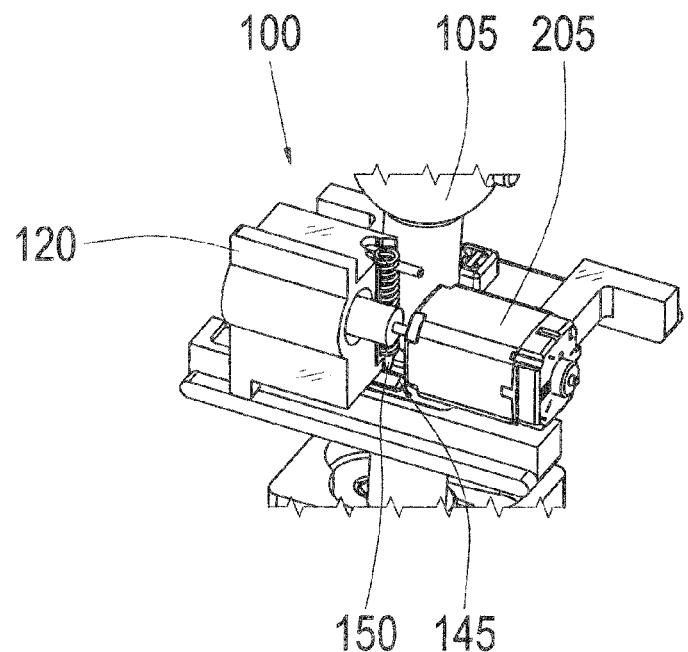

The FIGS. 5a and 5b show schematic representations of three-dimensional cross-section of selector lever resetting device 100 with front selector 105 in accordance with one embodiment of the present disclosure. A cut through that the selector lever resetting device 100 displayed in FIG. 3b is in case of FIG. 4. It is to realize that the locking element 150 is pressed over in the latching position of the locking slide 120 on the elevation of the latching contour 145, so that the locking element 150 is to be situated in contrast to FIG. 4 now on one of the selector lever 105 side facing of the elevation.

FIG. 5b shows a rear view in FIG. 5a shown selector lever resetting device 100, while in the foreground of the locking slide 120 and selector lever 205 are presented, and is shown in the background of the selector lever 105.

Figure 6A:
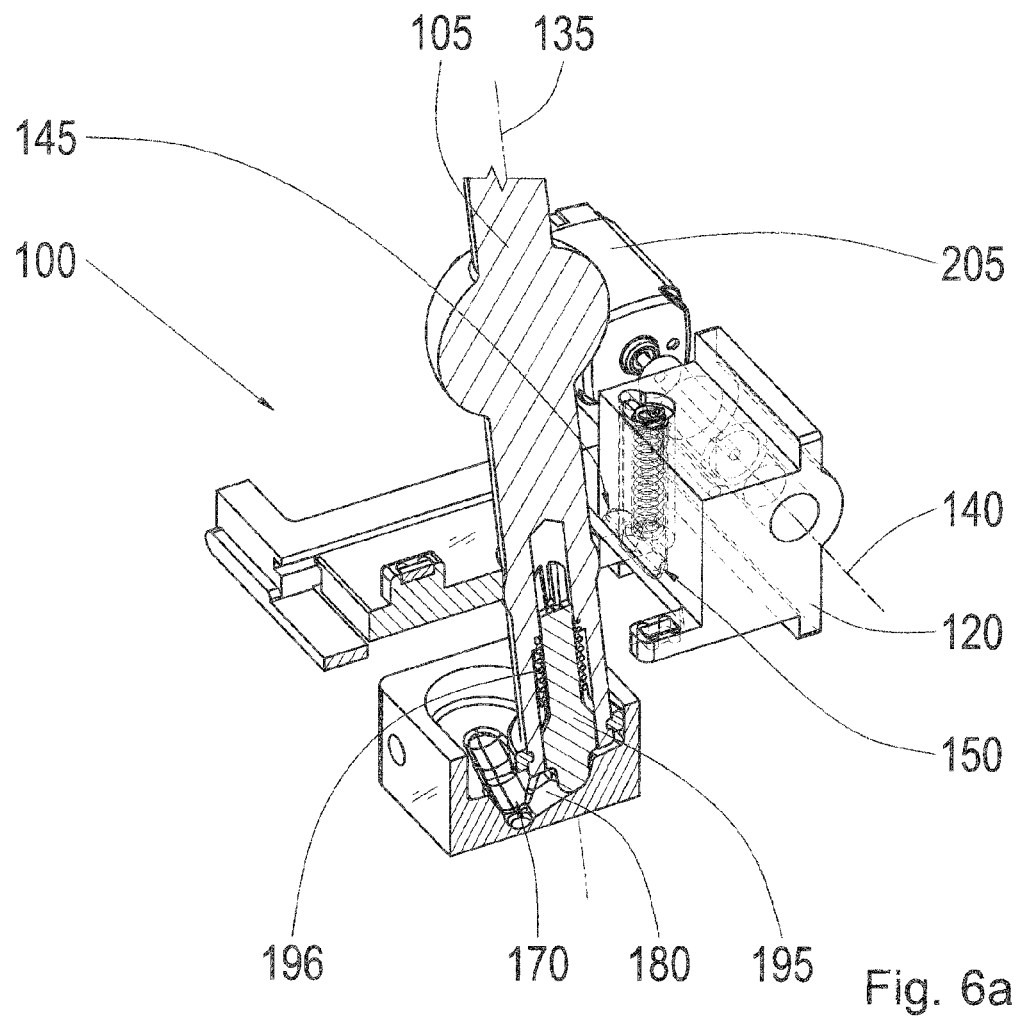
FIGS. 6a, 6b are schematic three-dimensional cross-section presentations of a selector lever resetting device with released latching contour in accordance with one embodiment of the present disclosure.
Figure 6B:
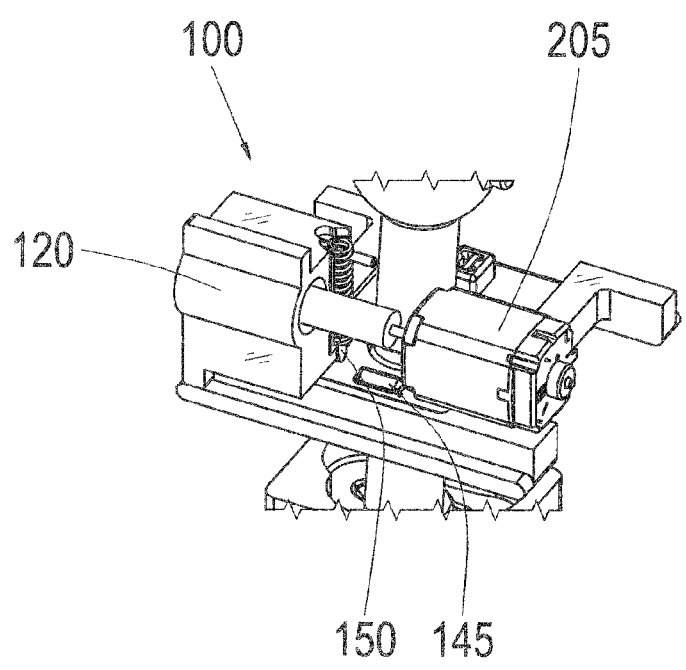

The FIGS. 6a and 6b show schematic representations of three-dimensional cross-section of selector lever resetting device 100 with shared locking contour 145 in accordance with one embodiment of the present disclosure. In contrast to the FIGS. 5a and 5b, the locking slide 120 is in the FIGS. 6a and 6b in the release position in which the locking element 150 along the sliding axis 140 is arranged laterally offset to the latching contour 145. Thus the latching contour is released and lifted the fixation of the select lever 105 in the actuating position 135.

By the acting on the locking body 195 prestressing force of the header element 196, the selector lever 105 is now moved back on the switching gate 180 in the first recess 170, as shown in the following FIGS. 7a and 7b.

The locking slide 120 with the integrated locking element 150 can be formed in accordance with an embodiment in response to a signal representing a position change of the vehicle transmission, for instance caused by the activation of an auto-P function, driven by the drive unit 205 of the locking position in to the release position.

A rear view displayed in in FIG. 6a selector lever resetting device is shown in FIG. 6b. A perspective of the rear view displayed in the FIG. 6b corresponds to a perspective of the rear view shown in FIG. 5b.

Figure 7A:
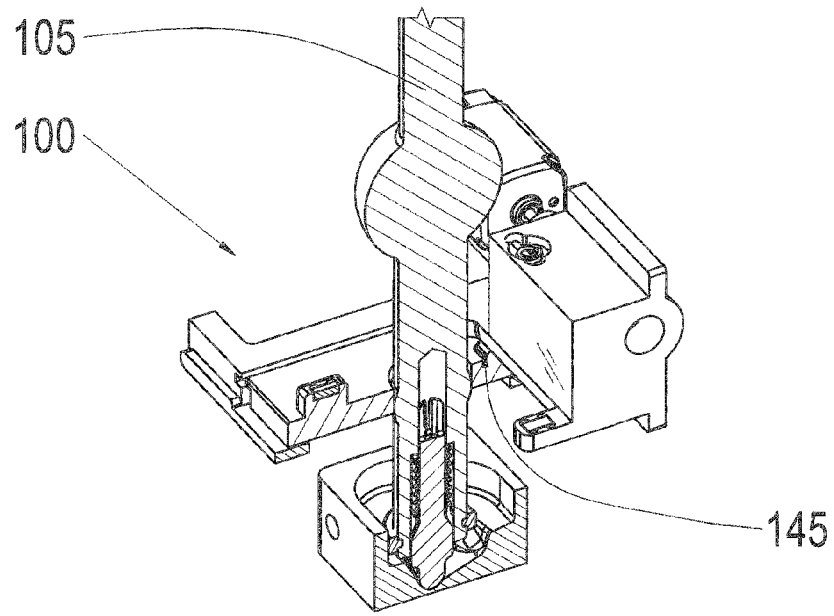
FIGS. 7a, 7b are schematic three-dimensional cross-section presentations of a selector lever resetting device with released latching contour in accordance with one embodiment of the present disclosure.
Figure 7B:
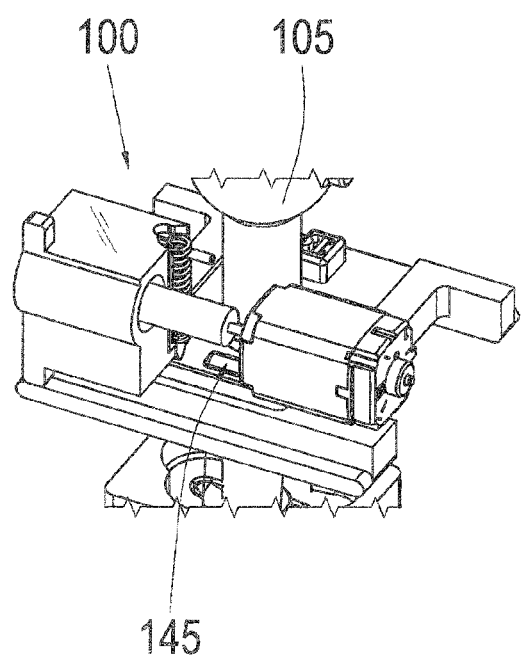

The FIGS. 7a and 7B schematic three-dimensional cross-sectional diagrams show a selector lever resetting device 100 with released latching contour 145 in accordance with one embodiment of the present disclosure. In contrast to the FIGS. 6a and 6B, the selector lever 105 in FIGS. 7a and 7B is located in the latching position 130.

A rear view displayed in in FIG. 7a selector lever resetting device is shown in FIG. 7b. A perspective of the rear view displayed in the FIG. 7b corresponds to a perspective of the rear view shown in the FIGS. 5b and 6b According to one embodiment, is made possible without any additional actuator force by a superposition of different resting contours 145, 150, 170, 175, 185 and the activation of each required resting contours a provision of the selector lever 105 The actuator 205 serves merely to release a biased system. A significantly lower force is required, which has a positive effect on costs and acoustics. An optional use of the actuator 205 for an additional locking function brings an additional space and cost advantage.

Figure 8:
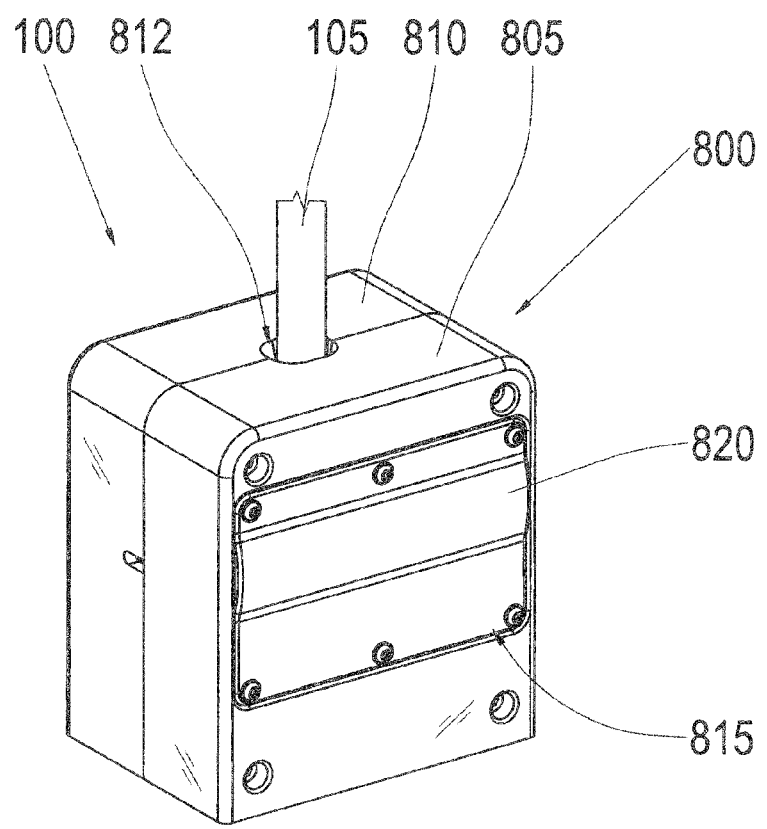
FIG. 8 is a schematic three-dimensional presentation of a selector lever resetting device with a casing in accordance with one embodiment of the present disclosure.

FIG. 8 shows a schematic three-dimensional representation of a selector lever resetting device 100 comprising a casing 800 according to an embodiment of the present disclosure. The selector lever resetting device 100 is enclosed by the casing 800. The casing 800 has, for example a two-part structure composed of a first casing half 805 and a second casing half 810. The casing halves 805, 810 are screwed together, for example. The selector lever 105 is performed through a casing recess of casing 800 812. A front page of the first case half 805 is with a front opening 815, which is locked by a lock plate 820.

The FIGS. 9a to 9f show schematic three-dimensional representations of different installation states of a selector lever resetting device 100 with a case of 800 in accordance with one embodiment of the present disclosure. The selector lever resetting device 100 can be in the FIGS. 1 to 7b shown selector lever resetting device.

Figure 9A:
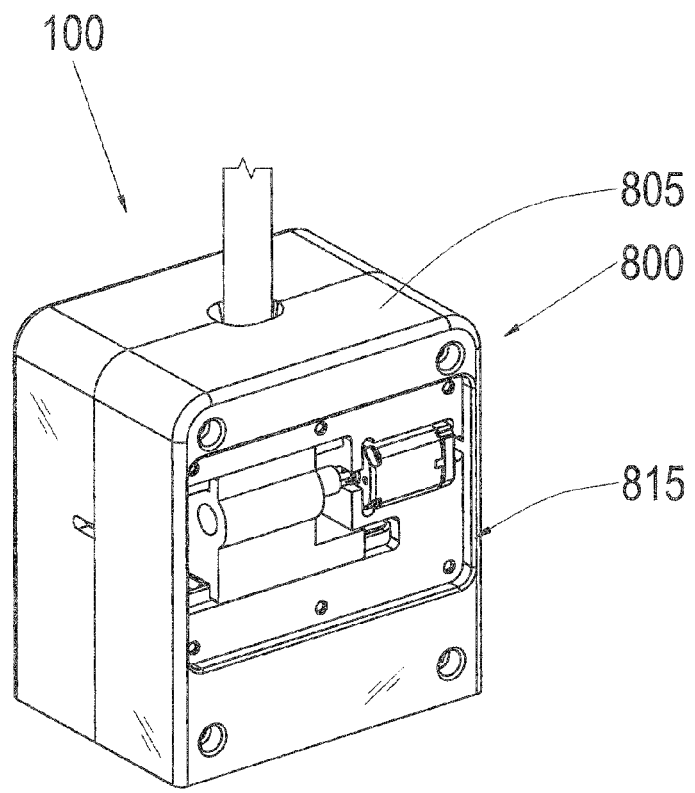
FIGS. 9a, 9b, 9c, 9d, 9e, 9f are schematic three dimensional presentations of different installation states of a selector lever resetting device with a casing in accordance with one embodiment of the present disclosure.

FIG. 9A shows the casing 800 without locking plate. A first part of the selector lever resetting device 100 is visible through the front opening of 820. The first part of the selector lever resetting device 100 is arranged into a similarly shaped recess in the first case half of 805.

Figure 9B:
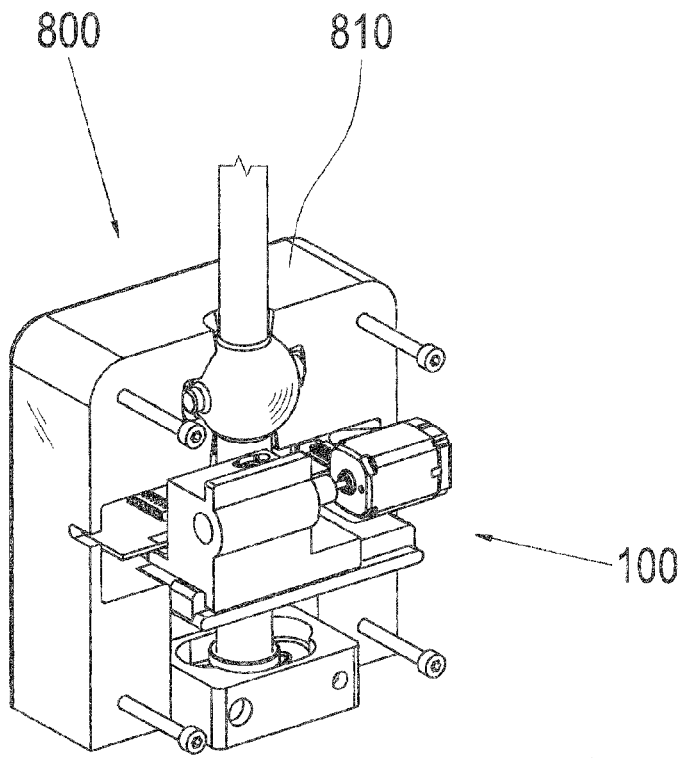

FIG. 9b shows the casing 800 without the first casing half. Similar to the first half of the casing is realized with a recess in second case half of 810 which is shaped to receive a second part of the selector lever resetting device 100.

Figure 9C:
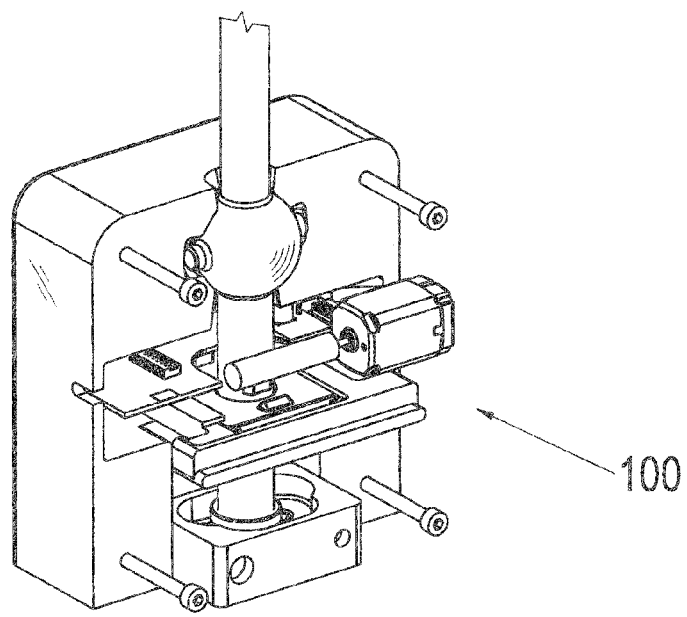

FIG. 9c shows the selector lever resetting device 100 in accordance with the FIG. 9b, but without locking slide.

Figure 9D:
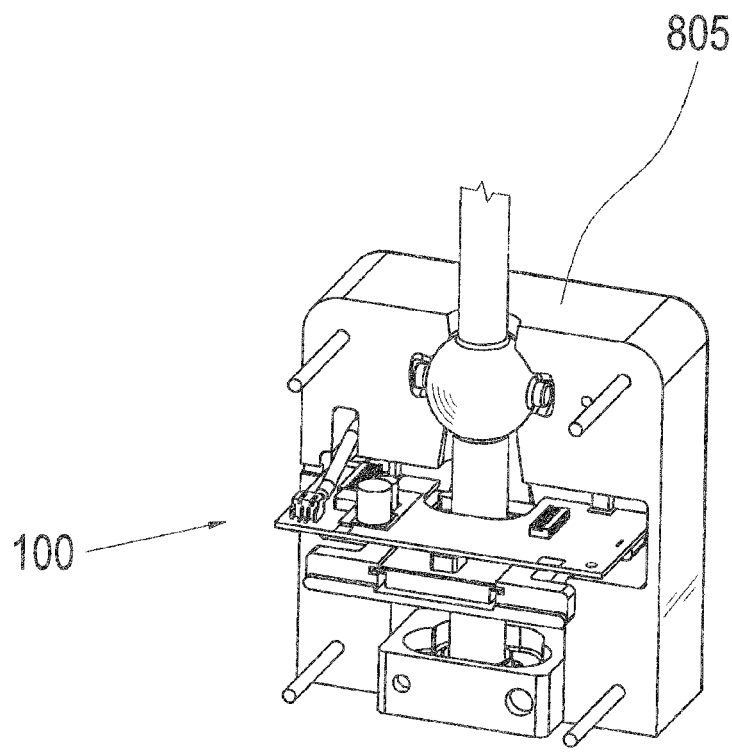

FIG. 9d shows the first casing half 805 with therein contained first part of selector lever resetting device 100.

Figure 9E:
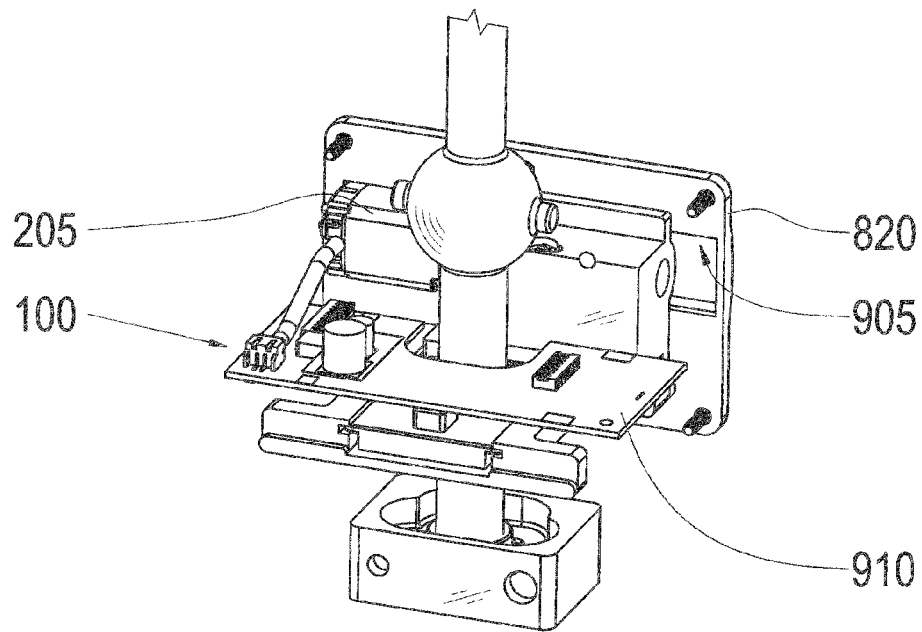

FIG. 9e shows the selector lever resetting device 100 and the locking plate 820. The locking plate 820 is provided with a plate recess 905, in which the locking plate 820 overlooking one portion of the drive unit 205 are arranged as well as the locking plate 820 overlooking one portion of the locking plate 120. The plate recess 905 can be formed to lead the locking slide 120 along the slide axle.

In addition, the selector lever resetting device 100 includes a circuit board of 910 with control electronics. The control electronics is connected to the drive unit 205 and configured to control the drive unit 205, for example, by using a gear position representing signal.

Figure 9F:
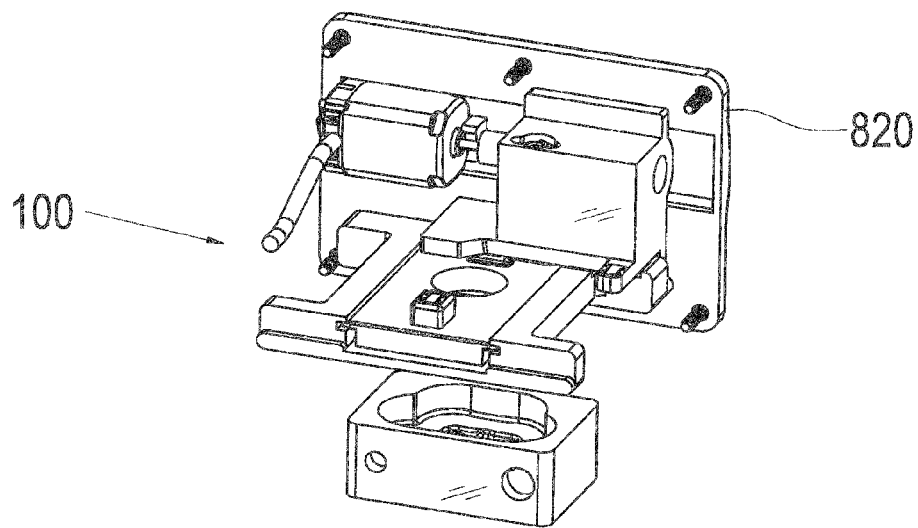

FIG. 9f shows the selector lever resetting device 100 and the locking plate 820 in accordance with the FIG. 9e, however without the selector lever and the circuit board with the control electronics.

Figure 10:
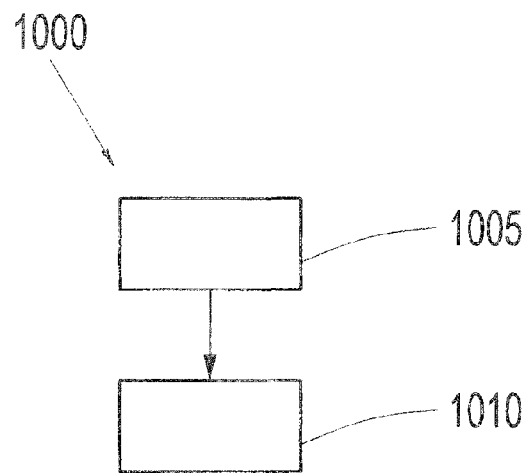
FIG. 10 is a flow chart of a process to operate a selector lever resetting device in accordance with one embodiment of the present disclosure.

FIG. 10 shows a flow chart of a process 1000 to run a selector lever resetting device in accordance with one embodiment of the present disclosure. The rest outline with the locking element due to a movement of the select lever from the initial position to the actuating position along a sliding axis is engaged in a step of 1005. Due to a movement of the locking slide of the locking position in the release position along a sliding axis different from the slide axle, the latching contour is now released in step 1010.

According to one embodiment, a lever motion is generated by means of two latching contours and an actuator, for instance by means of an electric motor, but also by means of other actuators such as linear actuators, solenoids, piezo elements or muscle wires.

Figure 11:
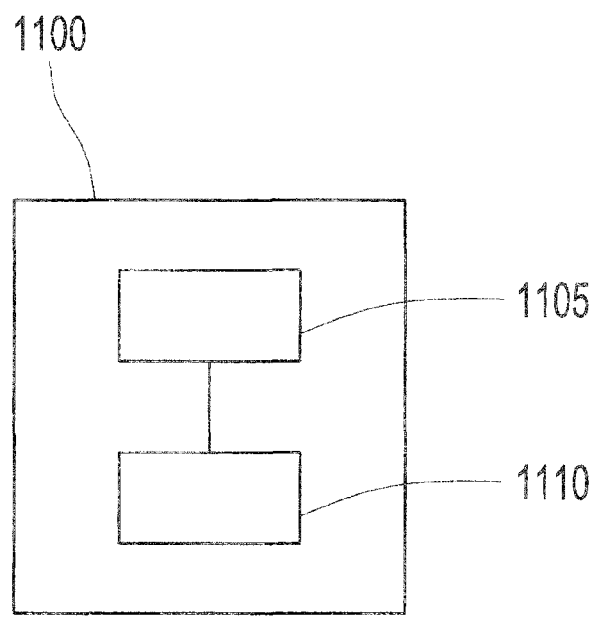
FIG. 11 is a block diagram of a device to perform a procedure in accordance with one embodiment of the present disclosure.

FIG. 11 shows a block diagram of a device 1100 to perform a procedure in accordance with one embodiment of the present disclosure. The device 100 includes a reverse latch unit 1105 to the locking of the latching contour with the locking element due to a movement of the select lever from the initial position to the actuating position along a sliding axis, as well as a release unit 1110 to share the latching contour due to a movement of the locking slide from the locking position to the release position along a sliding axis different from the slide axle.

The embodiments described and shown in the FIGS. are chosen only by way of example. Different examples of execution can be combined fully or in relation to individual characteristics. Also, an embodiment can be supplemented by features of a further embodiment.

In addition, this procedure can be reviewed and executed in a language other than in the described order. Further, when an embodiment is described with a first feature and a second feature, it may so be read that the embodiment may have both the first feature and the second feature and in accordance with another embodiment has only one of the first feature and the second feature.

REFERENCE NUMERALS

100 selector lever resetting device
105 selector lever
110 lever guide equipment
115 sliding element
120 locking slide
125 sliding axis
130 latching position
135 actuating position
140 slide axle
145 latching contour
150 resting element
155 further sliding element
160 gear shifting gate
165 scene recess
170 first recess
175 second recess
180 change gate
185 end of the lever
190 preload device
195 locking body
196 preload elements
198 lever recess
200 blocking element
205 drive unit
400 guide channel
405 spring element
410 step-up gear unit
800 casing
805 first casing half
810 second
812 casing recess
815 front opening
820 locking plate
905 plate recess
910 circuit board with control electronics
1000 method of operating of a selector lever resetting device
1005 locking the latching contour with the latching element
1010 release of the latching contour
1100 device to perform a procedure to run a selector lever resetting device
1105 locking unit
1110 release unit

The invention claimed is:

1. A selector lever resetting device for a vehicle transmission, the selector lever resetting device comprising:
   a selector lever configured to select a gear position of the vehicle transmission;
   a lever guide device, the lever guide device having a first sliding element and a locking slide,
   where the first sliding element is adjustable along a first sliding axis and has a latching contour,
   where the selector lever is coupled to the first sliding element and configured to be moved along the first sliding axis between a latching position, and an operating position,
   where the locking slide is adjustable along a second sliding axis to move at least between a locking position and a release position,
   where the locking slide includes a locking element, the locking element being engaged with the latching contour when the selector lever is in the operating position and the locking slide is in the locking position, and the locking element being released from the latching contour when the locking slide is in the release position, and
   where the locking slide includes a block element that is separate from the locking element, the block element extending in a direction parallel to the first sliding axis along a top surface of the locking slide, wherein the block element is positioned to prevent movement of the selector lever along the first sliding axis when the locking slide is in a blocking position; and a gear shifting gate with a first recess associated with the operating position and a second recess associated with the latching position, wherein the first recess has a depth greater than the second recess, and wherein the first recess and the second recess are connected by an inclined exchange lane.

2. The selector lever resetting device of claim 1, further comprising a spring element configured to press the locking element against the latching contour.

3. The selector lever resetting device of claim 1, further comprising a drive unit configured to move the locking slide between the locking position and the release position.

4. The selector lever resetting device of claim 3, further comprising a gearbox coupled to the drive unit, where the gearbox is configured to transmit a rotary motion generated by the drive unit into a linear movement of the locking slide.

5. The selector lever resetting device of claim 1, where a lever end of the select lever can be switched between the first recess and the second recess, and further comprising a preload device configured to apply a preload force to the lever end of the selector lever to move the selector lever.

6. The selector lever resetting device of claim 5, wherein the preload device includes a spring such that the lever end to have a tendency to move from the second recess, through the inclined exchange lane, and to the first recess absent an external force.

7. The selector lever resetting device of claim 5, where the selector lever includes a lever recess, where a latching body of the preload device is located within the lever recess, and where the preload force applied to the lever end of the selector lever is greater when the selector lever is in the first recess than when the selector lever is in the second recess.

8. The selector lever resetting device of claim 1, where the first recess is an automatic gate for automatic switching of the vehicle transmission and the second recess is a manual gate for manual switching of the vehicle transmission.

9. The selector lever resetting device of claim 1, where the blocking element prevents a locking body from entering the second recess when the locking slide is in the blocking position.

10. The selector lever resetting device of claim 1, where the selector lever is received by a recess of the first sliding element.

11. The selector lever resetting device of claim 1, further comprising a second sliding element perpendicularly movable with respect to the first sliding element, where the second sliding element is movable along a third sliding axis parallel to the second slide axis, and wherein the second sliding element is configured to allow movement of the select lever between a plurality of predefined lever positions.

12. A selector lever resetting device for a vehicle transmission, the selector lever resetting device comprising:

a selector lever configured to select a gear position of the vehicle transmission;

a lever guide device having a first sliding element and a locking slide, where the first sliding element is adjustable along a first sliding axis and has a latching contour, where the selector lever is coupled to the first sliding element and is movable along the first sliding axis between a first position and a second position, where the locking slide is adjustable along a second sliding axis to move at least between a locking position and a release position, where the locking slide includes a locking element, the locking element configured to engage with the latching contour when the locking slide is in the locking position and when the first sliding element is in at least one of the first position and the second position, where the locking slide includes a block element that is separate from the locking element, the block element extending in a direction parallel to the first sliding axis along a top surface of the locking slide, wherein the block element is positioned to prevent movement of the selector lever along the first sliding axis when the locking slide is in a blocking position, and where the first sliding axis is perpendicular to the second sliding axis; and a gear shifting gate with a first recess associated with the first position and a second recess associated with the second position, wherein the first recess has a depth greater than the second recess, and wherein the first recess and the second recess are connected by an inclined exchange lane.

13. The selector lever resetting device of claim 12, further comprising a spring element configured to press the locking element against the latching contour.

14. The selector lever resetting device of claim 12, further comprising a drive unit configured to move the locking slide between the locking position and the release position.

15. The selector lever resetting device of claim 14, further comprising a gearbox coupled to the drive unit, where the gearbox is configured to transmit a rotary motion generated by the drive unit into a linear movement of the locking slide.

16. The selector lever resetting device of claim 12, where a lever end of the select lever can be switched between the first recess and the second recess, and further comprising a preload device configured to apply a preload force to the lever end of the selector lever such that the lever end of the selector lever has a tendency to move towards the first recess.

* * * * *